United States Patent
Narsutis et al.

[11] Patent Number: 5,945,145
[45] Date of Patent: Aug. 31, 1999

[54] EASY OPENING, REUSABLE PACKAGE TO FACILITATE ACCESS TO FOOD SLICES

[75] Inventors: Jo Ellen Nielsen Narsutis, Valley Village, Calif.; John F. McDevitt, Evanston; John C. Little, Des Plaines, both of Ill.

[73] Assignee: Kraft Foods, Inc., Northfield, Ill.

[21] Appl. No.: 09/196,371

[22] Filed: Nov. 19, 1998

Related U.S. Application Data

[63] Continuation of application No. 08/551,248, Oct. 31, 1995, abandoned, which is a continuation of application No. 08/163,332, Dec. 6, 1993, abandoned, which is a continuation-in-part of application No. 08/075,164, Jun. 10, 1993, abandoned.

[51] Int. Cl.⁶ .......................... B65D 17/28; B65D 17/34; B65D 17/00; B65D 77/30
[52] U.S. Cl. .......................... 426/123; 426/122; 426/130; 426/115; 383/211; 383/205; 383/206; 383/204; 383/203
[58] Field of Search .................................... 426/130, 129, 426/122, 123, 115; 383/211, 205, 206, 204, 203

[56] References Cited

U.S. PATENT DOCUMENTS

| | | | |
|---|---|---|---|
| 2,467,875 | 4/1949 | Andrews | 426/123 |
| 2,699,285 | 1/1955 | Bell et al. | 383/205 |
| 2,745,754 | 5/1956 | Steinbock | 383/211 |
| 3,080,238 | 3/1963 | Kraft et al. | 426/123 |
| 3,184,149 | 5/1965 | Repko | 383/203 |
| 3,203,621 | 8/1965 | Wright | 383/211 |
| 3,291,377 | 12/1966 | Eggen | 426/130 |
| 3,349,993 | 10/1967 | Ells et al. | 383/203 |
| 3,674,195 | 7/1972 | Stone | 383/211 |
| 4,066,167 | 1/1978 | Hanna et al. | 383/204 |
| 4,584,201 | 4/1986 | Boston | 383/211 |
| 4,629,071 | 12/1986 | Tani | 383/206 |
| 4,650,079 | 3/1987 | Tani | 383/206 |
| 4,709,399 | 11/1987 | Sanders | 383/211 |
| 4,840,270 | 6/1989 | Capuo et al. | 383/211 |
| 5,029,712 | 7/1991 | O'Brien et al. | 383/203 |
| 5,165,545 | 11/1992 | Focke et al. | 383/203 |

FOREIGN PATENT DOCUMENTS

| | | | |
|---|---|---|---|
| 8600546 | 10/1987 | Netherlands | 383/206 |
| 595512 | 12/1947 | United Kingdom | 426/123 |

*Primary Examiner*—Steven Weinstein
*Attorney, Agent, or Firm*—Fitch, Even, Tabin & Flannery

[57] ABSTRACT

A package for sliced food product comprising a bottom wall, a top wall, opposite sidewalls and opposite end walls, wherein the package includes a flap which comprises portions of the top wall and/or an adjoining sidewall of the package, and which is movable between a closed position and an open position to selectively facilitate access to the package interior. The package is preferably made of a thin, flexible plastic material. The flap is removably retained in closed position by a peelable seal extending along one or more edges of the flap, or at least along portions thereof. The package is configured so that when the flap is in open position, the sliced food product is accessible from the side, which facilitates engagement of slice edges and subsequent separation thereof, as well as removal of the slices without undue distortion. This makes the package particularly useful in conjunction with packaging of certain sliced cheeses, although the package may also be useful with other products as well.

3 Claims, 12 Drawing Sheets

EASY OPENING, REUSABLE PACKAGE TO FACILITATE ACCESS TO FOOD SLICES

This is a continuation of application Ser. No. 08/551,248, filed Oct. 31, 1995, now abandoned, which is a continuation of application Ser. No. 08/163,332, filed Dec. 6, 1993, now abandoned, which in turn is a continuation-in-part of application Ser. No. 08/075,164, filed Jun. 10, 1993, now abandoned.

BACKGROUND OF THE INVENTION

The invention relates generally to packaging, and more particularly to a package employing one or more peelable seals to facilitate opening.

One prior art packaging operation that has been used commercially for bulky products such as stacks of sliced cheese or blocks of cheese involves orienting a web of laminated polymeric material horizontally, placing product on the web, wrapping the web upward around both sides of the product, bringing the longitudinal edges together to form a longitudinal fin seal, and subsequently sealing the ends and cutting the finished package from the web. Gas flush techniques may be employed to eliminate oxygen from the package interior. Such an operation is illustrated in the context of packaging for blocks or chunks of cheese in U.S. Pat. No. 3,274,746.

Another known packaging apparatus functions in a manner generally similar to that described above, except that the web is positioned above the product and wrapped downward around the product to form the fin seal beneath the product.

In recent years, there has been increased demand for packaging that may be easily opened by a consumer without the need for a cutting implement such as a knife or scissors, and which may be reclosed and reopened one or more times. There have been numerous proposals for provision of easy-open features to facilitate opening of food packages. Some such proposals have involved provision of areas of weakness to enable a marginal portion of the package to be torn along a line. Other packages have a peelable seal along a seam of package.

U.S. Pat. No. 3,740,237 discloses a peelable, resealable bond in a wiener package. U.S. Pat. No. 5,012,928 discloses a package for cheese slices comprising a tray with a lid or cover attached thereto by a hinge. U.S. Pat. No. 4,957,571, No. 3,249,288 and No. 4,663,915 disclose further examples of reclosable packages for food products.

There is a continuing need for improvement in easy-open, reclosable packaging, particularly in the areas of ease of opening and reclosing, and cost.

It is a general object of the invention to provide an improved reclosable package for sliced food products which has one or more peelable seals to facilitate opening and reclosing thereof, and which is sufficiently economical to be suitable for commercial use in packaging of products for consumer sale. Further objects and advantages of the invention are set forth below.

SUMMARY OF THE INVENTION

In accordance with the invention, there is provided a package for sliced food products comprising a bottom wall, a top wall, opposite sidewalls, and opposite end walls, wherein the package includes a flap which is movable between a closed position and an open position to selectively facilitate access to the package interior, and which either may comprise portions of the top wall and an adjoining sidewall of the package, or may comprise a label adhered to portions of the top wall and/or an adjoining sidewall. The package is preferably made of a thin, flexible plastic material. The flap is removably retained in closed position by a peelable seal extending along one or more edges, or at least along portions thereof.

The package may be configured so that when the flap is in open position, the sliced food product is accessible from the side as well as the top, which facilitates engagement of slice edges and subsequent separation thereof, as well as removal of the slices without undue distortion. The latter feature is particularly significant with respect to products which will not remain intact if subjected to excessive mechanical stresses. For example, certain cheeses are relatively inelastic, and develop surface discontinuities in response to bending during removal from packaging, leading to loss of slice integrity.

In accordance with a first embodiment of the invention, the flap forms portions of the top wall and an adjoining sidewall of the package, and comprises a separate piece, rather than being formed with the remainder of the package from a single web or sheet. In this embodiment, to prevent the flap from being completely removed from the package, the flap may be permanently sealed along a horizontal edge to a sidewall of the package, and peelably and resealably sealed along its other edges. An opening is provided in the package walls underlying the flap. The opening is preferably wider than the slices of food product so that the slices can be withdrawn through the opening without bending. The opening is preferably made by providing a line of weakness in the top wall and sidewall of the package beneath the flap, so that as the flap is pulled open, portions of the top wall and sidewall of the package are pulled away with the flap. As an alternative to employing a permanent seal along an edge of the flap to prevent it from being completely removed from the package, the line of weakness may be configured to accomplish this function, in combination with the adhesion of the flap to the underlying package material. To this end, the line of weakness, rather than extending about the entire periphery of the opening, may extend only about a portion of the opening, so that the portions of the top wall and sidewall which are pulled away when the flap is opened are not completely disconnected from the adjoining package material, but remain connected thereto. The package may have a longitudinal fin seal extending along its bottom wall.

In a second embodiment, the package is formed of a single sheet of flexible material having longitudinal edge portions joined to one another to form a longitudinal fin seal along the top wall, and having transverse edge portions joined to one another to form transverse end seals intersecting the longitudinal fin seal at opposite ends thereof. The longitudinal fin seal is a peelable seal, and the transverse end seals have peelable seal regions thereon, so that the package is capable of being opened by separating the longitudinal edge portions from one another and separating the transverse end seals at their peelable seal regions without tearing the package material. The package is capable of being resealed by pressing together the transverse edge portions and the longitudinal edge portions.

In accordance with a third embodiment of the invention, there is provided a package generally similar to the second embodiment, but having edge portions of unequal width brought together to form the longitudinal fin seal, with the wider edge portion extending beyond the narrower edge portion. The wider edge portion has a strip of reusable adhesive thereon which may be covered, if desired, by a strip of removable tape. In this embodiment, the longitudinal fin seal and transverse end seals do not comprise resealable peel seals thereon, but rather comprise only non-resealable peelable seals. The adhesive strip which is initially covered by tape is employed to retain the package in a closed configuration after initial opening. In the reclosed configuration, the longitudinal fin seal is laid flat so that the adhesive on the wider edge portion maintains the wider edge portion in contact with the top wall of the package and the end walls thereof.

In other embodiments a reclosable package opening is provided by parting the package material along a line of weakness or tear strip extending from one end seal to the other along a sidewall of the package with a flap or label sealed to the package on both sides of the line of weakness, and peelably and resealably attached thereto on at least one side of the line of weakness.

To open the package in these embodiments, the label is peeled away from the package material on one side of the line of weakness, and the package material is then parted at the line of weakness or tear strip to provide the opening. Where a line of weakness is employed, the relationship between the strength of the line of weakness and the adhesion of the label to the package material adjacent to the line of weakness may be selected so that continued downward force on the label after the label has been peeled away from the line of weakness causes the package material to part at the line of weakness. The line of weakness may preferably extend substantially along an upper corner edge of the package, i.e., along the upper edge of one of the sidewalls where it meets the top wall, and the line of weakness may be formed, for example, as a perforation or score line, or line of reduced material thickness. In the precursor to the package, i.e., a planar sheet of material or blank, which is disposed as a portion of a continuous web of package material, the line of weakness may be substantially linear and extend longitudinally of the web of package material so that it may be formed continuously as the web advances.

DETAILED DESCRIPTION OF PREFERRED EMBODIMENTS

The invention is generally embodied in a package for sliced food products comprising a bottom wall, a top wall, opposite sidewalls and opposite end walls. The package is preferably formed from a web of thin, flexible plastic material. The material may be any one of a number of known laminated polymeric films which comprise a relatively tough and durable outer layer in combination with one or more inner layers which may provide features such as relative impermeability to air and moisture, and heat seal capability. The material may alternatively comprise a single layer "monofilm," and is not necessarily impermeable to air or moisture. Furthermore, the film need not have heat seal capability. Cold seals, e.g., seals formed from a pressure-sensitive adhesive, may be employed. The web may have flaps or labels sealed or otherwise attached thereto at package-length intervals for incorporation into the finished packages in certain embodiments as described below. The film selected for the illustrated embodiments preferably has a thickness of less than 0.01 in., and may have a thickness in the range of 0.001 to 0.004 in.

In the embodiment shown in FIGS. 1 through 7, the package 10 comprises a top wall 12, a bottom wall 14, a pair of sidewalls 16, and a pair of end walls 18. The package contains a food product 20 comprising a stack of cheese slices 22. The package preferably is made in a horizontal wrapping operation by continuously wrapping a web about the food product with marginal longitudinal opposite edges of the web brought together to form a longitudinal fin seal 24 beneath the product, and with cross seals 26 formed at the ends of the package to define end walls.

To facilitate access to the sliced food product 20 in the package 10 while also enabling the package to be resealed, a single opening 28 is formed in adjacent portions of the top wall 12 and one of the sidewalls 16, selectively covered by a flap 30 having a resealable peel seal 32 extending about a portion of its periphery. The peel seal adhesive may be applied to either or the flap or the web, or both, as desired. The flap may be permanently sealed along a horizontal strip 34 to the sidewall 16 of the package, and preferably has the resealable peelable seal 32 disposed about the remainder of its periphery. The permanent seal 34 may be provided by using a different adhesive from that used to provide the peelable seals, or may be provided by employing different sealing techniques with the same adhesive. The seal 32 includes first and second vertical portions 36 extending upward at opposite ends of the sidewall 16, first and second horizontal portions 38 extending parallel to the ends of the package at opposite ends of the top wall 12; diagonal portions 40 extending inward therefrom; and a linear portion 42 disposed generally centrally of the top wall 12. A tab 44 is left unsealed to facilitate initiation of opening of the package. The width of the flap 30 is slightly greater than the width of the opening 28 in the sidewall and top wall of the package. The opening 28 is shaped generally similarly to the flap, and is slightly wider than the slices 22 to enable the slices to be withdrawn without distortion.

During manufacture of the package 10, the web is preferably pre-cut with a die-cut perforation or otherwise provided with a line of weakness 50 corresponding to the desired shape of the opening 28. The flap 30 is then applied as a separate piece to the web. The flap 30 is preferably a label having adhesive covering one side thereof. The label is applied to the web to cover the die-cut perforation or other line of weakness 50. As the web advances, the label is folded with the underlying substrate, and remains in position. When the consumer desires to open the finished package, the consumer grasps the tab 44 and peels the label away from the top wall. The adherence of the label to the portions 46 and 48 of the top wall and sidewall respectively within the line of weakness severs the package material along the line of weakness, and the portions 46 and 48 top and side of the walls are carried with the flap as the flap is folded open. The line of weakness 50 may, if desired, include a segment extending horizontally along the sidewall 16 adjacent the permanent seal 34 so that the line of weakness is a closed curve, and package material within the closed curve is completely separated from the remainder of the package material. However, it is believed that it may be more desirable to have the line of weakness 50 extend about only a portion of the periphery of the opening, so that package material within the line of weakness 50 remains connected to adjacent package material along one edge of the flap. This may eliminate the need for a permanent seal to be formed at this location, in that the strength of the package material remaining intact will prevent the flap from being entirely removed from the underlying package material. Insofar as provision of a permanent seal along one segment, in combination with a peelable seal along other segments, may require two passes on coaters, and/or use of two separate adhesives, this may result in significant savings. In accordance with this feature, the line of weakness 50 illustrated in FIGS. 1 through 5 is not a closed curve extending about the entire periphery of the opening, but rather terminates at the lower ends of vertical portions of the line of weakness extending down the sidewall 16 of the package.

Figure 1:
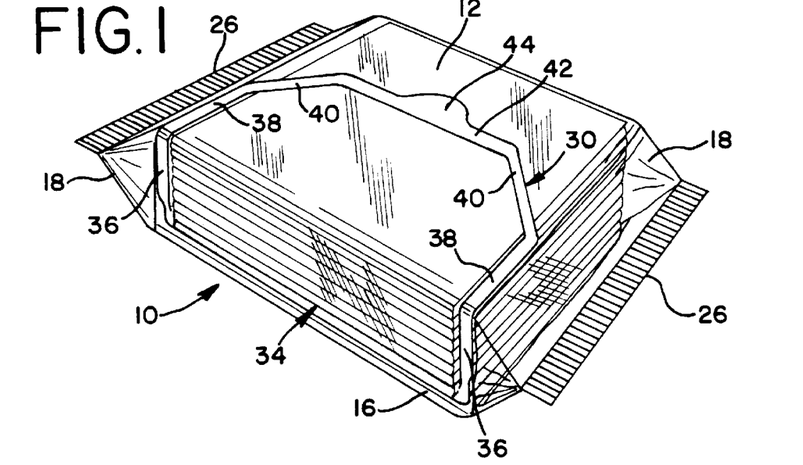
FIG. 1 is a perspective view of a package for sliced food product in accordance with an embodiment of the invention.
Figure 2:
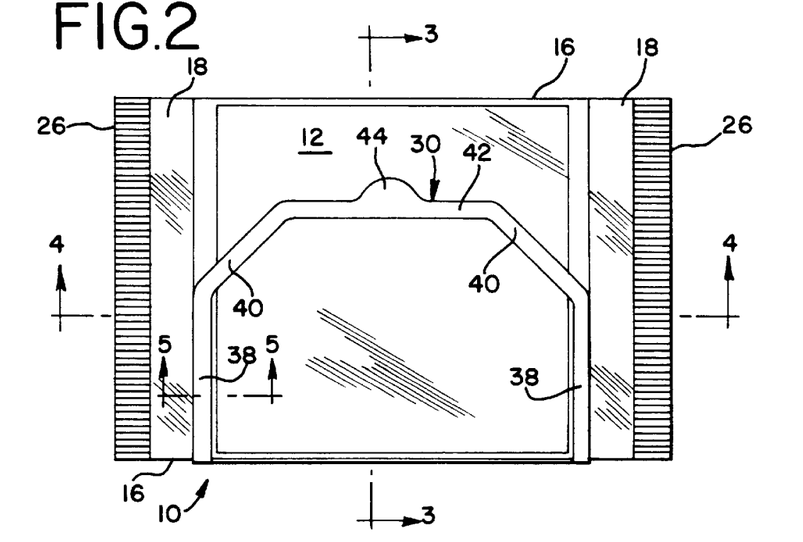
FIG. 2 is a plan view of the package of FIG. 1.
Figure 3:
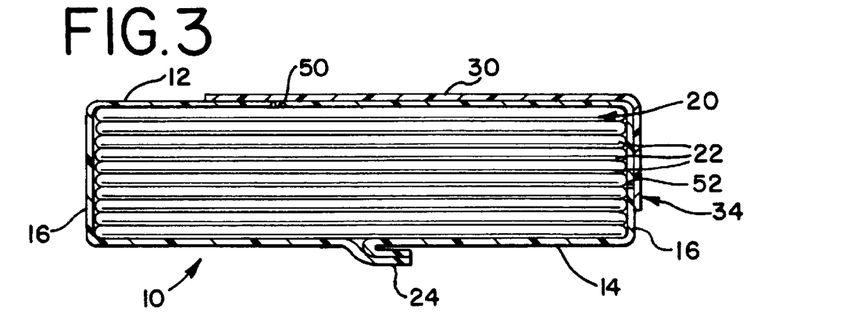
FIG. 3 is a sectional view taken substantially along line 3—3 in FIG. 2.
Figure 4:
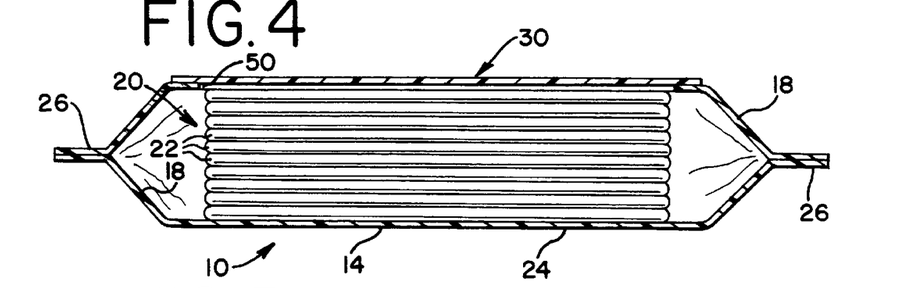
FIG. 4 is a sectional view taken substantially along line 4—4 in FIG. 2.
Figure 5:
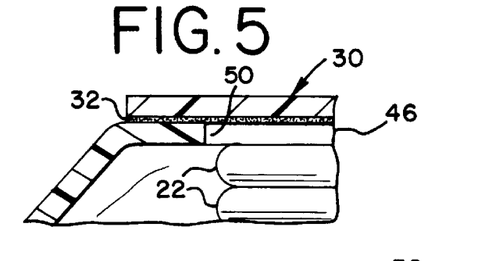
FIG. 5 is a fragmentary sectional view taken substantially along line 5—5 in FIG. 2.
Figure 6:
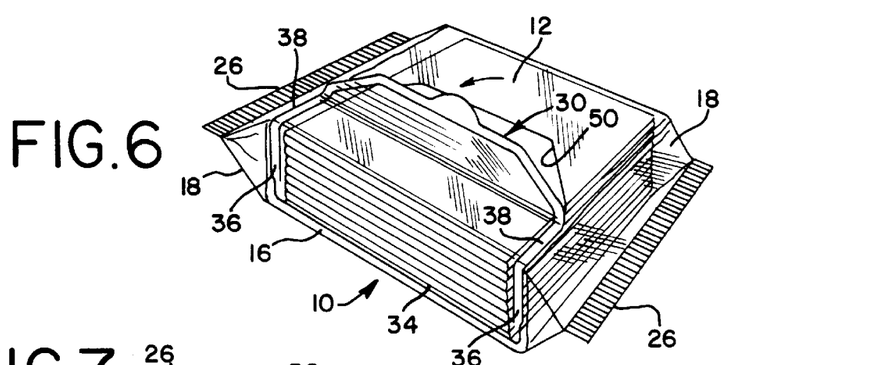
FIG. 6 is a perspective view, showing the package of FIG. 1 in a partially opened configuration.

While the illustrated food product 20 comprises sliced cheese 22, it will be appreciated that the package 10 may be useful for packaging other sliced food products, such as processed meats and the like, or other items.

One problem that must be addressed in providing a peelable flap of the type employed in the embodiment of FIGS. 1 through 7 is that the consumer may find it difficult to peel the flap to the proper location to fully open the flap without pulling the flap too far. To address this problem by providing the consumer with a tactile aid to determining the proper stopping point, the package of FIGS. 1 through 7 may be modified slightly by employing a flap configuration best described with reference to FIG. 7a.

Figure 7:
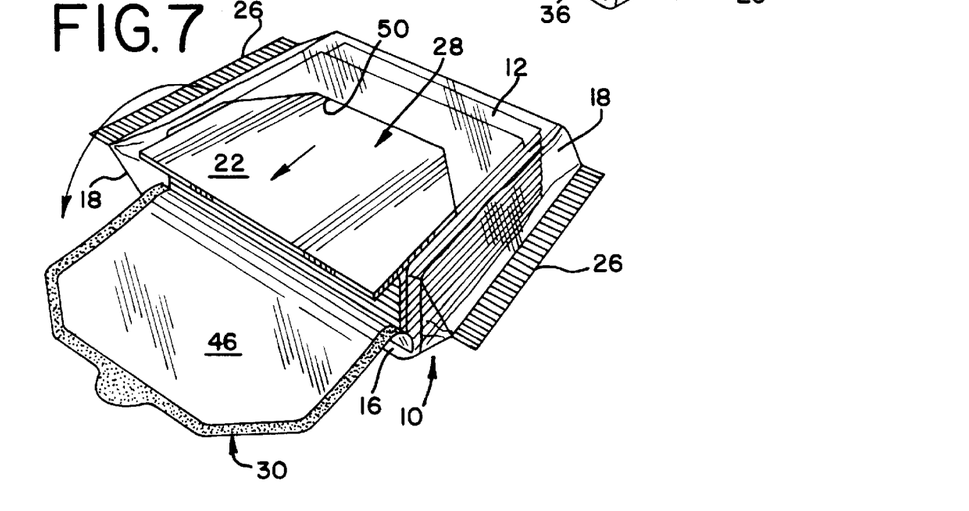
FIG. 7 is a perspective view, showing the package of FIG. 1 in a fully opened configuration.
Figure 7A:
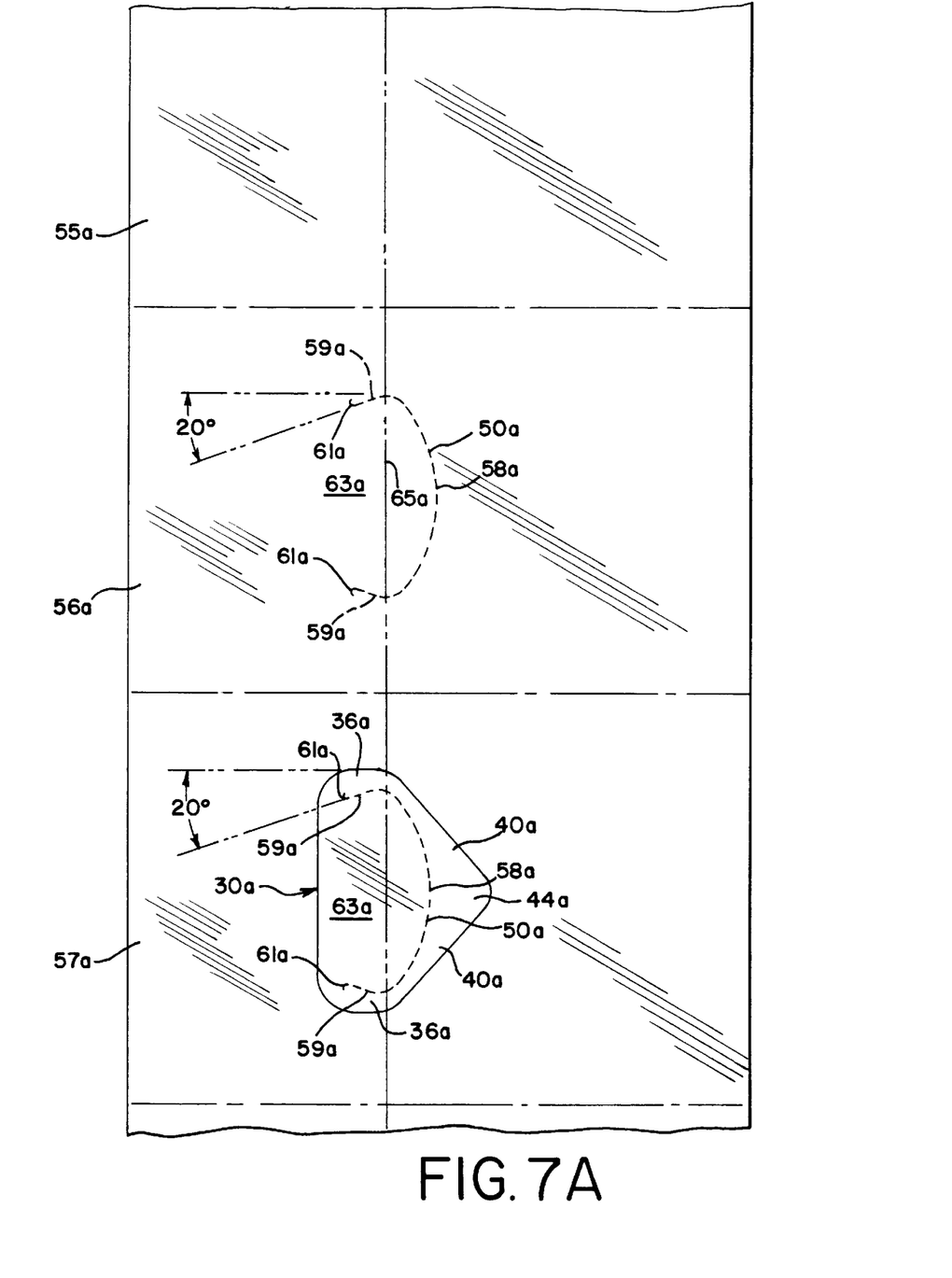
FIG. 7a is a plan view of a portion of a web of package material for forming a modified version of the package of FIGS. 1–7.
Figure 8:
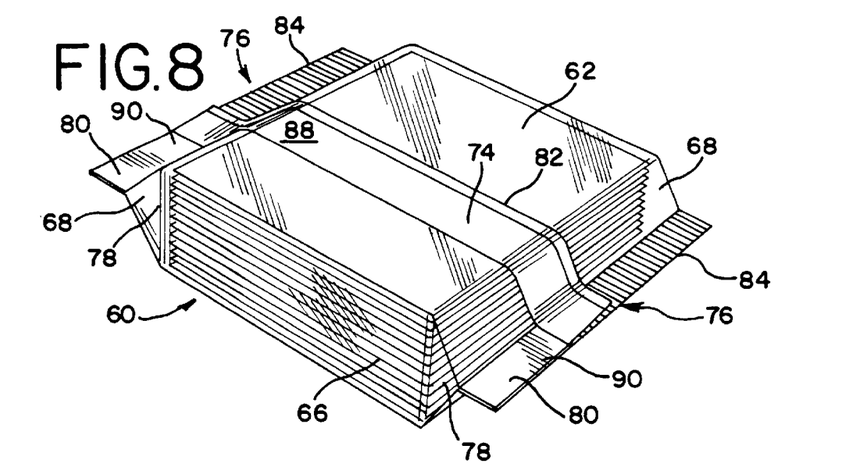
FIG. 8 is a perspective view of a package for sliced food product in accordance with the second embodiment of the invention.
Figure 9:
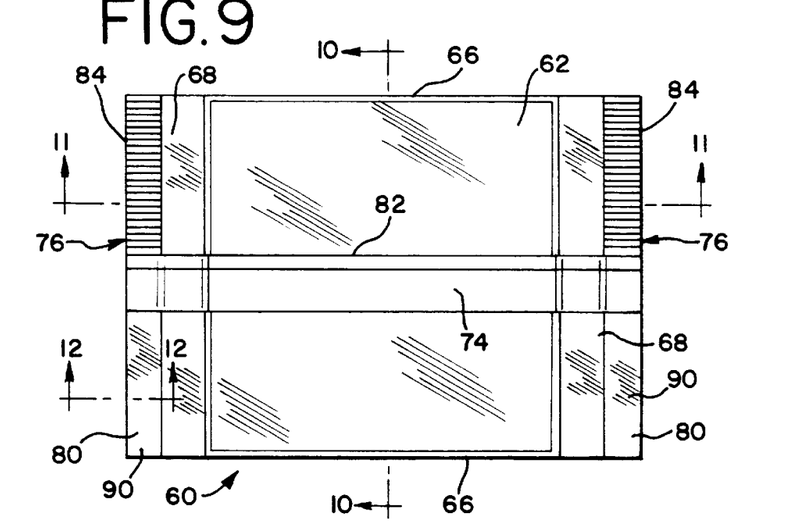
FIG. 9 is a plan view of the package of FIG. 8.
Figure 10:
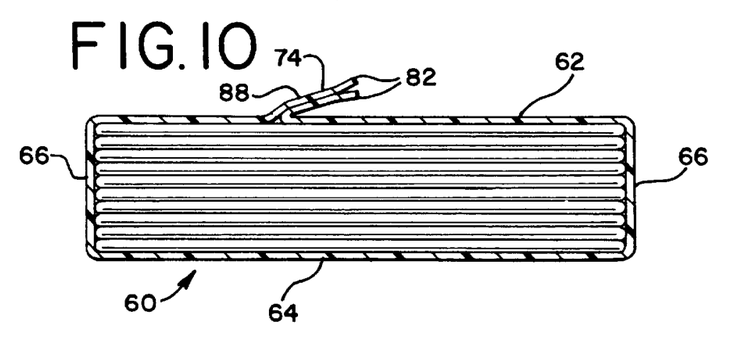
FIG. 10 is a sectional view taken substantially along line 10—10 in FIG. 9.
Figure 11:
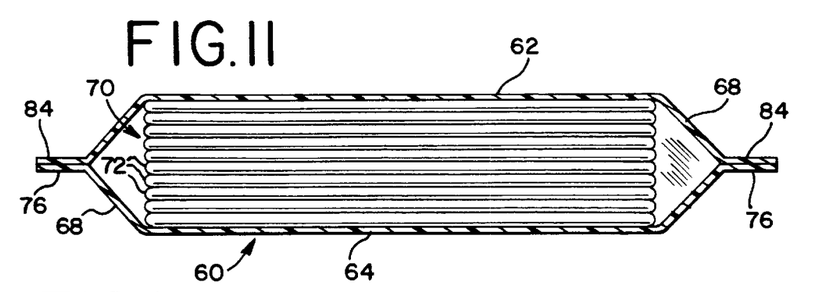
FIG. 11 is a sectional view taken substantially along line 11—11 in FIG. 9.
Figure 12:
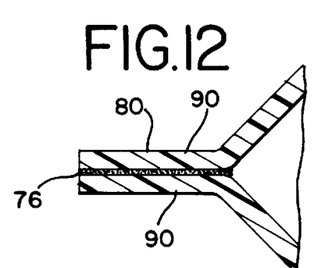
FIG. 12 is a fragmentary sectional view taken substantially along line 12—12 in FIG. 9.
Figure 13:
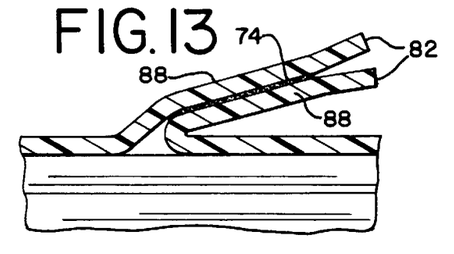
FIG. 13 is an enlarged sectional detail view of the longitudinal fin seal shown in FIG. 10.

FIG. 7a illustrates a portion of a web to be used for forming a modified version of the package of FIGS. 1 through 7, comprising three blanks 55a, 56a, and 57a at varying stages of completion. The package to be formed from the web of FIG. 7a differs from the package of FIGS. 1 through 7 only with respect to the configuration of the flap and its associated line of weakness. The blank 55a at the earliest point in the packaging line comprises an uncut, generally rectangular area of the web which may be pre-printed with labeling (not shown) for the product to be contained in the package. The second blank 56a has a line of weakness 50a in the form of a generally horseshoe-shaped line of perforation formed therein. The third blank 57a has a label 30a peelably sealed thereto over the line of weakness to function as a flap for opening and closing the package. The label is peelably sealed to the blank over the entire surface of the label except at a central tab 44a which is to function as a starting point for peeling. The label is thus peelably sealed to the web along diagonal peelable seal portions 40a which diverge from the tab 44a outside of the line of weakness, and to side portions 36a of the peelable seal outside the line of weakness, as well as to the portion 63a of the web inside of the line of weakness which is to be pulled away as the package is opened.

The line of weakness 50a comprises a curved central portion 58a which will lie upon the top wall of the finished package, and a pair of side portions 59a which will extend down the side of the package. To aid the consumer in feeling the proper stopping point, the side portions 59a preferably terminate at stops 61a which, in the illustrated embodiment, comprise sharply curved "hooks", i.e., arcuate portions of the line of weakness having radii of curvature much smaller than those of adjacent portions, but which might in other embodiments comprise circular cutouts or other means for sharply increasing resistance to tearing at the ends of the line of weakness. To provide further assistance to the consumer to prevent peeling of the flap beyond the intended stopping point, the side portions 36a of the peel seal area preferably increase in width approaching the stops 61a so that the peeling force required to continue peeling of the flap increases near the stops. To effect the desired increase in width, each side portion of the line of weakness is preferably angled inward at an angle of about 20 degrees relative to the adjacent side portion of the label 30a as shown. The widest point of the curve defined by the line of weakness in the embodiment of FIG. 7a substantially coincides with the fold line 65a at which the top wall will meet the sidewall in the finished package.

FIGS. 8 through 15 illustrate a second embodiment of the invention comprising a package 60 which has a top wall 62, a bottom wall 64, a pair of sidewalls 66 and a pair of end walls 68. The package contains a food product 70 such as cheese slices 72. The end walls comprise extensions of the top, bottom and sidewalls which are brought together at a transverse end seal 76 on each end wall, with extensions 78 of the sidewalls 66 being folded inward at the ends of the package. A longitudinal fin seal 74 extends along the top wall 62 and slopes down along the upper portions of the end walls 68 to intersect the transverse end seals 76.

The package of FIGS. 8 through 15 is formed from a continuous web of package material, with opposite marginal edge portions 88 being brought together and sealed to one another to form the fin seal.

Figures 14, 15:
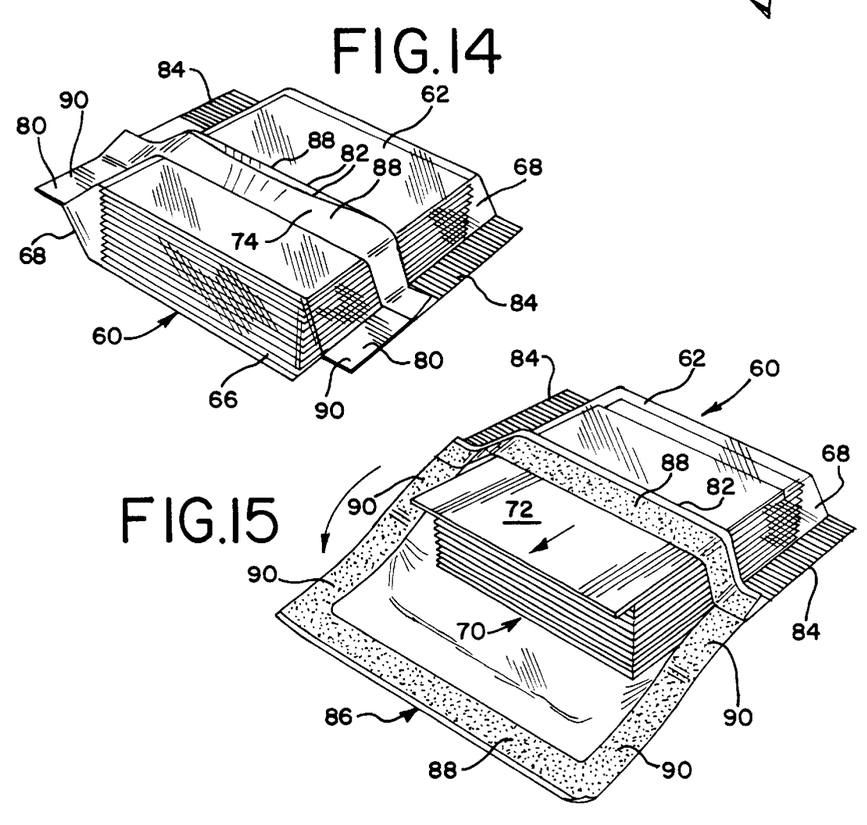
FIG. 14 is a perspective view, showing the package of FIG. 8 in a partially opened configuration.
FIG. 15 is a perspective view, showing the package of FIG. 14 in a fully opened configuration.
Figure 16:
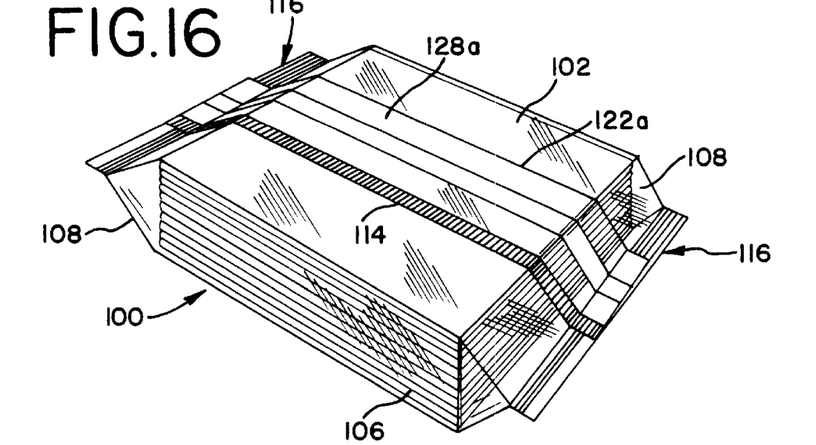
FIG. 16 is a perspective view of a package in accordance with a third embodiment of the invention.
Figure 17:
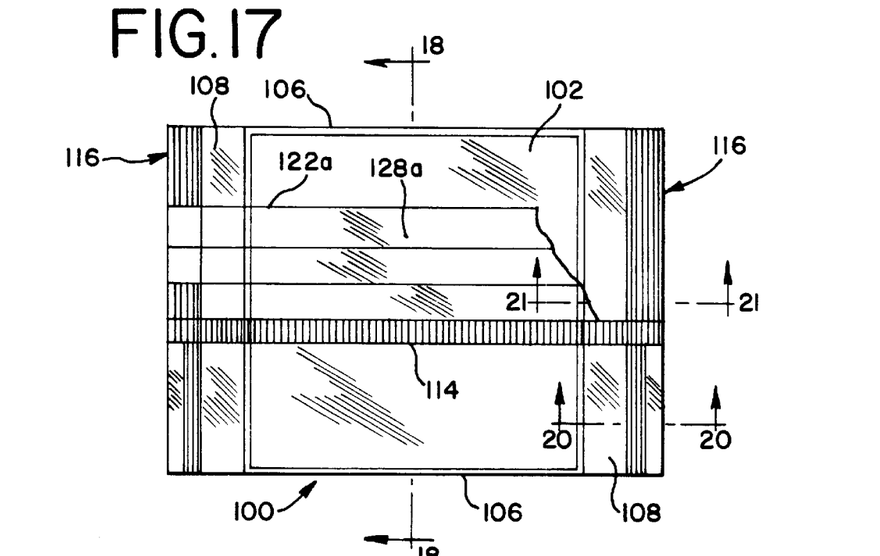
FIG. 17 is a plan view of the package of FIG. 16.
Figure 18:
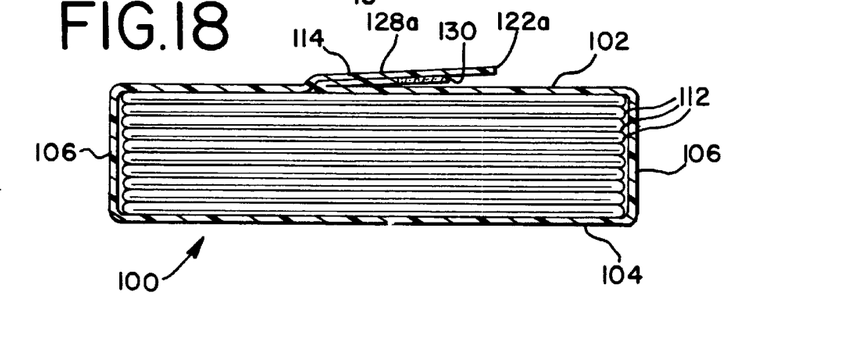
FIG. 18 is a sectional elevational view taken substantially along line 18—18 of FIG. 17.
Figure 19:
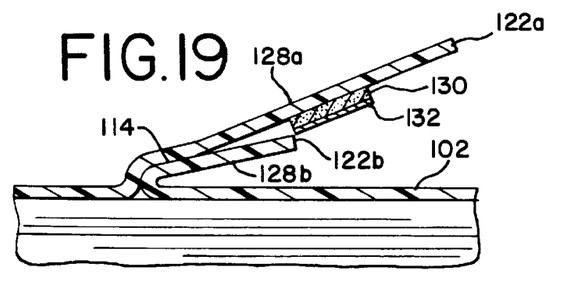
FIG. 19 is an enlarged fragmentary sectional elevational view of the fin seal of FIG. 18, shown in a partially opened configuration.
Figure 20:
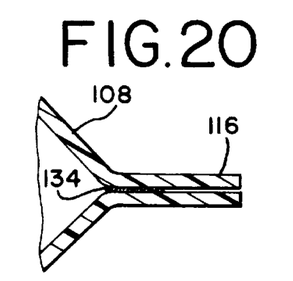
FIG. 20 is an enlarged fragmentary sectional elevational view taken substantially along line 20—20 in FIG. 17.

In accordance with an aspect of the invention, the longitudinal fin seal 74 is a resealable, peelable seal and the transverse end seals have resealable, peelable seal regions 80 on the same side of the longitudinal fin seal 74 so that the package may be resealably opened by first separating the longitudinal edge 82 adjacent the fin seal 74 as shown in FIG. 14, peeling open the fin seal 74, and subsequently peeling apart both of the peelable seal portions 80 of the opposite transverse end seals. The remaining portions 84 of the transverse end seals, on the opposite side of the longitudinal fin seal, may be permanent seals, i.e., seals having strength about equal to or greater than the strength of the material joined. After peeling apart the peelable seal regions 80, a flap 86 comprising a portion of the top wall 62 and one of the sidewalls 66 may be folded open.

After the package 60 is opened as described above, slices of cheese 72 may be conveniently withdrawn from the package by sliding the slices generally horizontally in the direction indicated by the arrow in FIG. 15. Thereafter, the package 60 may be resealed by folding the flap 86 back upward and pressing the marginal edge portions 88 back together to reform the longitudinal fin seal 74. The user may then slide his or her fingers along the adjacent transverse edge portions 90 of the package 60 to reseal the transverse end seals 76.

In the embodiment of the invention illustrated in FIGS. 16–24, the package 100 comprises top and bottom walls 102 and 104, opposite sidewalls 106 and opposite end walls 108. The end walls 108 comprise extensions of the top, bottom and sidewalls brought together to form the transverse end seals 116. A longitudinal fin seal 114 extends along the top wall 102, formed by joinder of opposite longitudinal marginal longitudinal edge portions 128a and 128b. The package 100 contains a food product 110 comprising a stack of slices 112 of cheese. The longitudinal fin seal 114 is formed between edge portions 128a and 128b of unequal width such that the wider marginal edge portion 128a extends laterally beyond the narrower 128b. On the wider portion 128a, an adhesive strip 130 is provided, with a removable cover tape 132 provided thereon. Immediately adjacent the top wall of the package, the longitudinally marginal edge portions 128 are peelably sealed together. The seal 114 does not extend to the edge 122b of the narrower marginal edge portion 128b. Thus, to begin separation of the fin seal 114, the edge 122b may readily be separated from the adjacent marginal edge portion 128a.

Figures 21, 22, 23, 24:
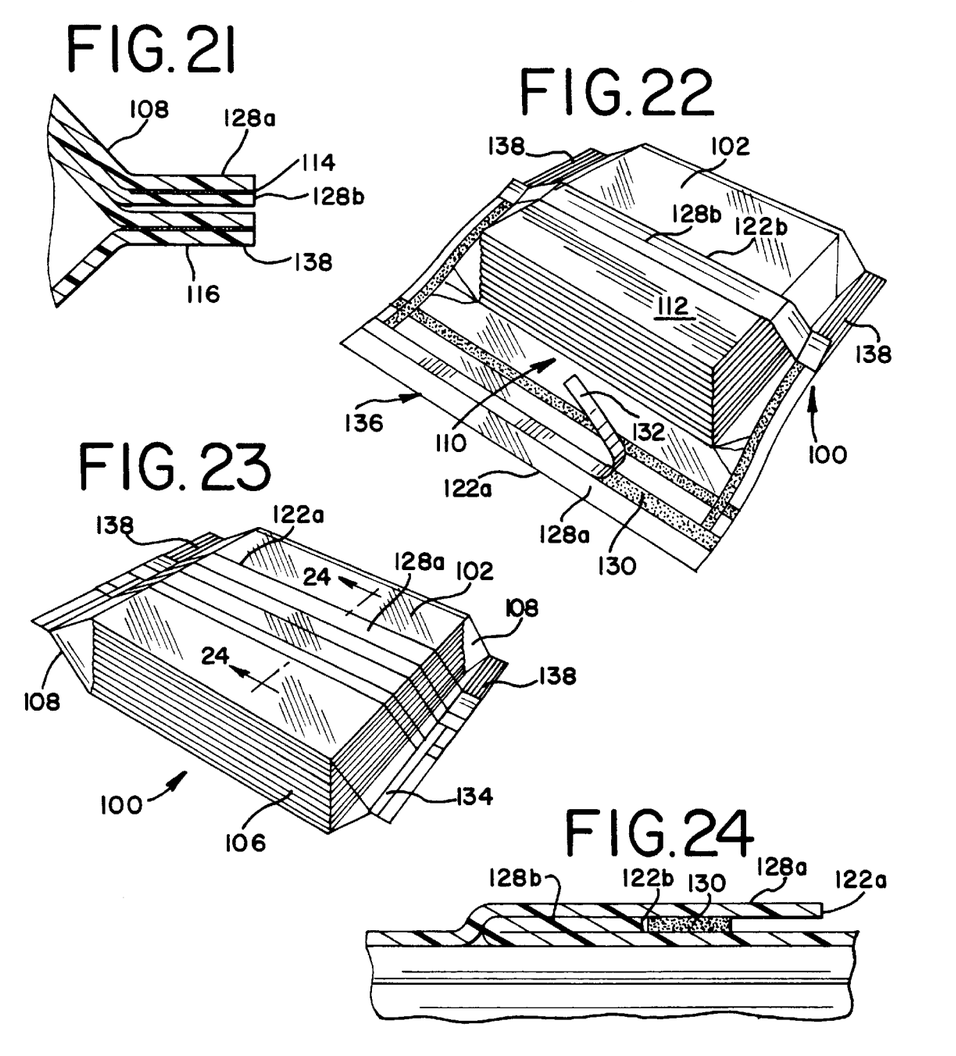
FIG. 21 is an enlarged fragmentary sectional elevational view taken substantially along line 21—21 in FIG. 17.
FIG. 22 is a perspective view of the package of FIG. 16, shown in an opened configuration.
FIG. 23 is a perspective view of the package of FIG. 16, shown in a reclosed configuration.
FIG. 24 is an enlarged fragmentary sectional elevation view taken substantially along line 24—24 of FIG. 23.

The package film is preferably a laminated film having one or more layers which respond to heat and pressure by forming a seal of variable strength, with the strength of the seal depending in part on the magnitude of the heat transfer and pressure applied. Thus, when the film is folded upon itself as in the region of the transverse end seals of the package 100, a peelable seal region may be provided adjacent a permanent seal region by varying the heat transfer, pressure and width of application as between the two regions. As shown in FIG. 22, each of the transverse end seals 116 comprises a strip 134 of peelable seal disposed along the transverse marginal edge portions on one side of the longitudinal fin seal 114 so that the flap 136 comprised of one of the sidewalls 106 and a portion of the top wall 102 of the container may easily be unfolded to provide access to the stack of sliced products 112 in the package. The portions 138 of the transverse end seals 116 opposite the flap 136 are preferably permanent seals which may be formed by application of greater heat and pressure than is applied to form the peelable seals 134, and sealing over a wider area than that of the peelable seals 134. The peelable seals 134 and permanent seals 138 may also be formed by cold-sealing techniques, or by sealing techniques other than those described above.

The removable tape 132 may be removed to provide resealability for the package, without requiring that the peelable seals 114 and 134 be resealable. As shown in FIGS. 23 and 24, in the reclosed configuration of the package, the longitudinal fin seal is folded flat against the top wall of the package, with the adhesive strip 130 on the longitudinal fin seal engaging the upper surface of the top wall. The strip 130 is spaced from the edge 122a of the marginal edge portion 128a sufficiently to permit the edge 122a to be manually separated from the top wall 102 to reopen the package. In the illustrated embodiment, the peelable seals 114 and 134 are not resealable, and, accordingly, the adhesive strip 130 alone maintains the package in closed position after reclosing, with the transverse end seals 116 partially unsealed. In other embodiments, the transverse end seals 116 may be resealable.

FIGS. 25 through 29 illustrate a package 210 in accordance with a fourth embodiment of the invention, comprising a top wall 212, a bottom wall 214, a pair of sidewalls 216, and a pair of end walls 218. The package contains a food product 220 comprising a stack of cheese slices 222. The package preferably is made in a horizontal wrapping operation by continuously wrapping a web about the food product with marginal longitudinal opposite edges of the web brought together to form a longitudinal fin seal beneath the product, and with cross seals 226 formed at the ends of the package to define end walls.

To facilitate opening of the package, a tear strip 228 is laminated to the package film and extends from one end seal 226 to the other, along the upper edge of one of the sidewalls. The tear strip 228 comprises a length of material which, when pulled, tears the adjacent package material along its length, and may coincide with a line of weakness in the substrate, or may function independent of any such line of weakness.

To facilitate reclosing of the package, a flap or label 230 is peelably and resealably sealed to the package so as to span the tear strip by a suitable adhesive 238, which may comprise either a hot-sealed or a cold-sealed adhesive. In the embodiment of FIGS. 25 through 29, the label 230 extends over portions of the top wall and the adjacent sidewall 216 along the upper edge of which the tear strip extends. The label has a tab 232 on the portion overlying the top wall 212 of the package which is not peelably sealed, and is not otherwise attached to the substrate, so that a person may readily open the package by inserting a finger under the tab, gripping the tab, and applying force upward and sideways, then downward, to peel the label 230 away from the underlying package material down to the tear strip 228. An end 234 of the tear strip may then be grasped between two fingers and pulled from one end of the package to the other to form an opening 240. The label 230 remains attached to the sidewall 216 beneath the opening 240 and may be re-adhered to the top wall 212 of the package by manual pressure to reclose the package after removal of product by the consumer. To facilitate initiation of the tearing, a V-notch 236 or other means for providing a stress concentration may be provided, along with visually perceptible indicia, along an edge of the film adjacent one or both ends of the tear strip.

Figures 25, 26:
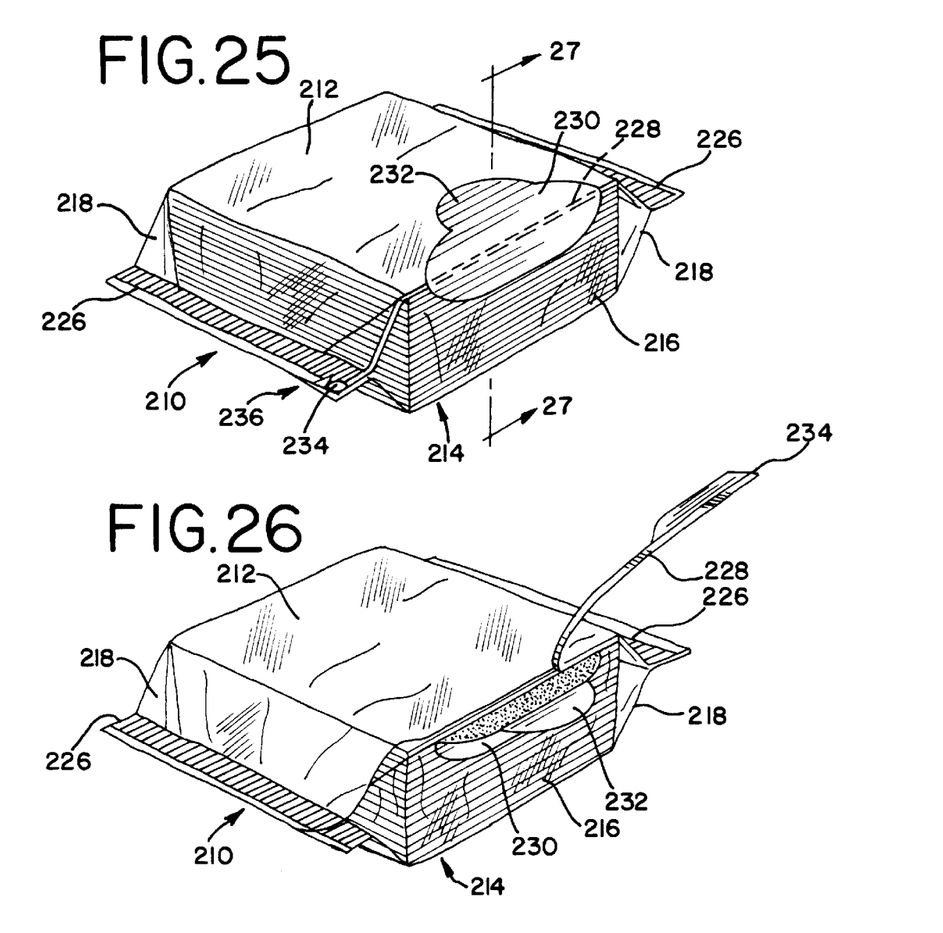
FIG. 25 is a perspective view of a package in accordance with a fourth embodiment of the invention.
FIG. 26 is a perspective view of the package of FIG. 25, shown in a partially opened configuration.
Figure 27:
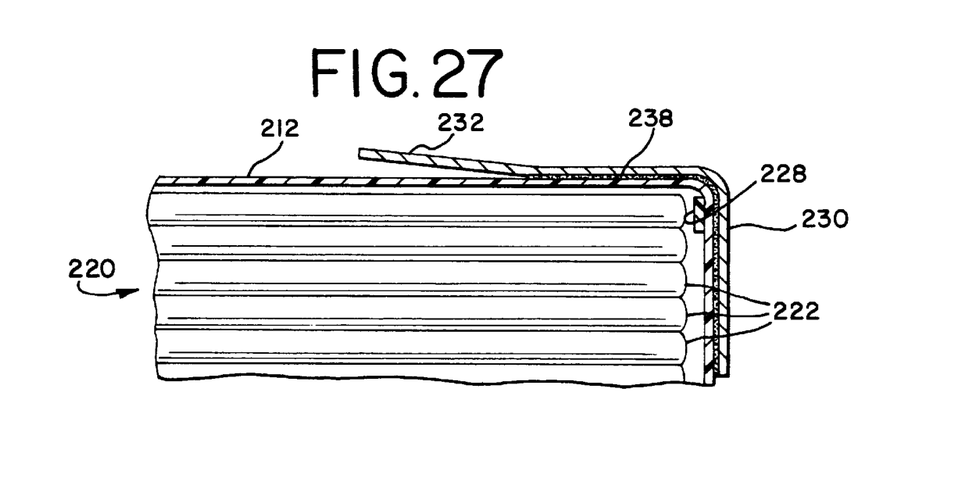
FIG. 27 is an enlarged fragmentary sectional elevational view taken substantially along line 27—27 in FIG. 25.
Figure 28:
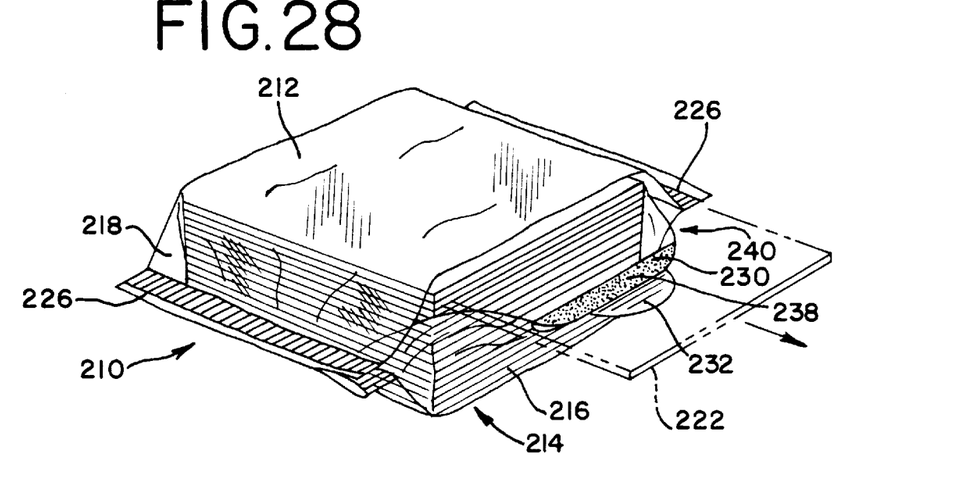
FIG. 28 is a perspective view of the package of FIG. 25, shown in a fully open configuration, with a slice being removed from the package shown in phantom.
Figure 29:
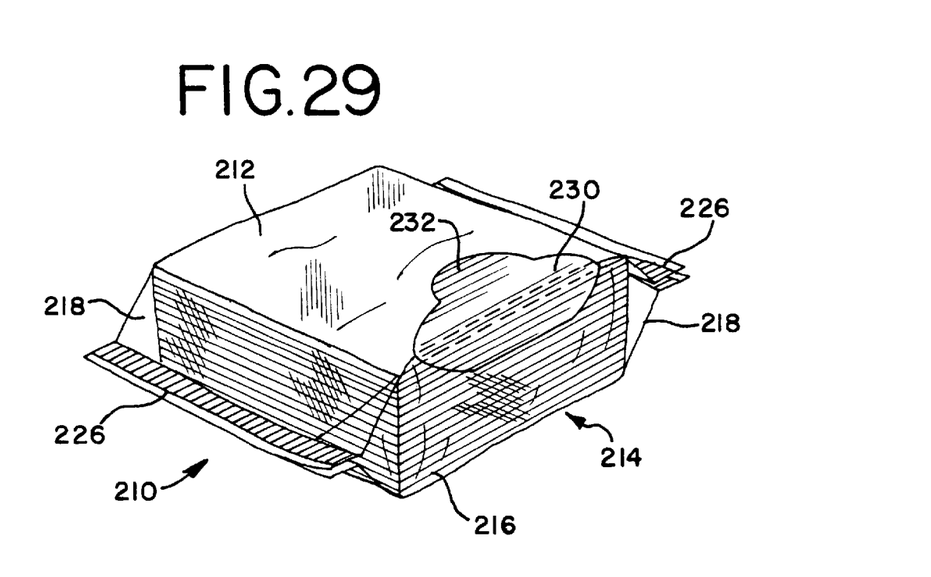
FIG. 29 is a perspective view of the package of FIG. 25, shown in a reclosed configuration.
Figure 30:
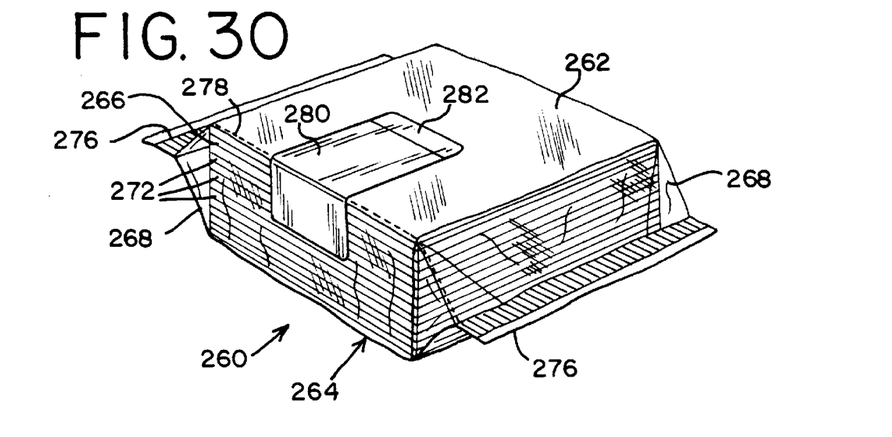
FIG. 30 is a perspective view of a package in accordance with a fifth embodiment of the invention.

The tear strip 228 may comprise an elongated strip of material sealed to the flexible package material. The tear strip material may have a tear strength and tensile strength greater than that of the adjacent package material, by virtue of greater thickness or different composition than the package material. In the alternative, the tear strip may be of the same material as the package and of substantially the same or even less strength than the package material, relying upon the combined strength of the tear strip in combination with the underlying substrate to enable the tear strip to provide a relatively neat opening in the package.

FIGS. 30 through 34 illustrate a package 260 in accordance with a fifth embodiment of the invention, comprising a top wall 262, a bottom wall 264, a pair of sidewalls 266, and a pair of end walls 268. The package contains a stack of slices 222 of a food product such as cheese, and is preferably made in a horizontal wrapping operation as described above, which forms a longitudinal fin seal along the bottom of the package, and transverse end seals 276 formed at the ends 268 of the package.

In the embodiment of FIGS. 30 through 34, a line of weakness 278 extends from one end seal 276 to the other, along the upper edge of one of the sidewalls. The line of weakness 278 may comprise a score line or a line of perforation, or may comprise a substantially linear area which has been otherwise treated to reduce tensile strength and/or shear strength of the material in the region. A flap or label 280 spans the line of weakness and is peelably and resealably sealed to the package on opposite sides of the line of weakness. The illustrated label 280 extends over portions of the top wall and the adjacent sidewall along the upper edge of which the line of weakness extends. Like the embodiment described above in connection with FIGS. 25 through 29, the label 280 has a tab 282 on the portion overlying the top wall 262 of the package which is not sealed to the underlying package material to facilitate manual gripping of the tab and initiation of peeling of the label 280 away from the package. To facilitate formation of an opening along the line of weakness 278, the line of weakness is sufficiently weak that it may be fractured by application of tension to the label 280 after peeling of the label down to the line of weakness.

Figure 31:
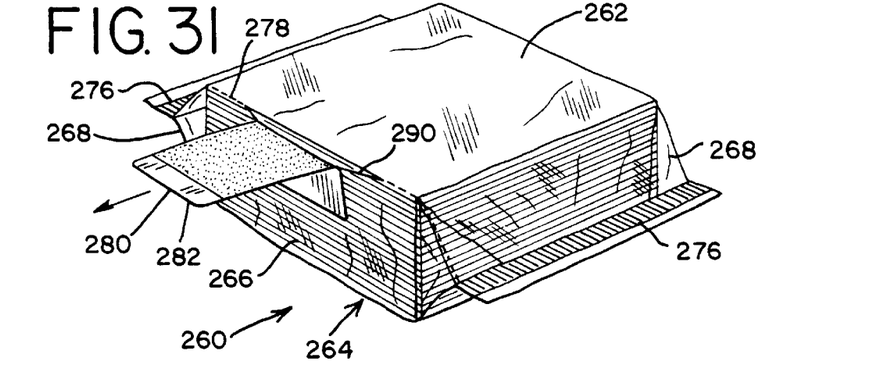
FIG. 31 is a perspective view of the package of FIG. 30, shown in a partially open configuration.
Figure 32:
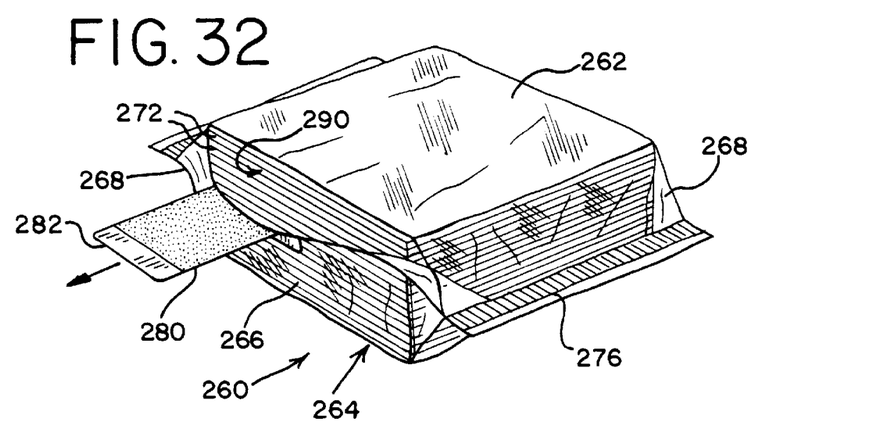
FIG. 32 is a perspective view of the package of FIG. 30, shown in a fully open configuration.
Figure 33:
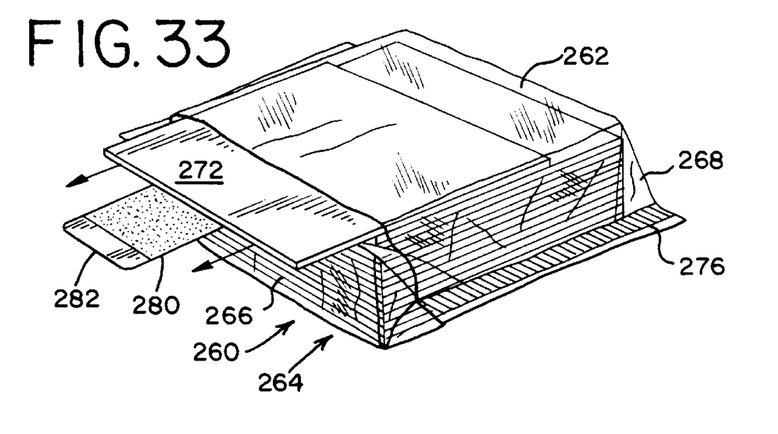
FIG. 33 is a perspective view of the package of FIG. 30, shown in a fully open configuration with a slice being withdrawn.
Figure 34:
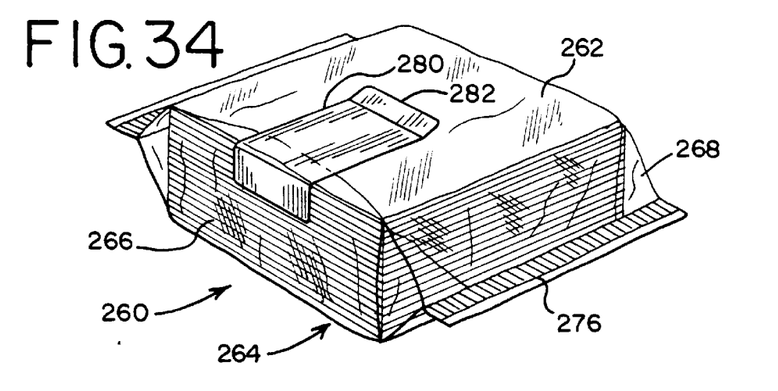
FIG. 34 is a perspective view of the package of FIG. 30, shown in a reclosed configuration.

To initiate opening of the package, the user grasps the label 280 at the tab and peels the label upward and away from the top wall of the package, and laterally toward the sidewall of the package. After the label has been fully removed from the top wall, continued application of tension to the label in a lateral and/or a downward direction as illustrated in FIG. 31 parts the package material at the line of weakness 278 to form a slit or opening 290 along the upper edge of the sidewall 266. Further application of tension to, and displacement of, the label in a downward direction or a lateral direction as illustrated in FIG. 32 results in propagation of the slit and enlargement of the opening. As illustrated in FIG. 33, the resulting opening 290 has a width greater than the width of the slices of food product so that slices may readily be withdrawn by manually sliding the slices in a sideways direction out of the package through the slit or opening. As illustrated in FIG. 34, the portion of the flap or label which was originally sealed to the top wall may then be resealed thereto to reclose the package.

Figure 35:
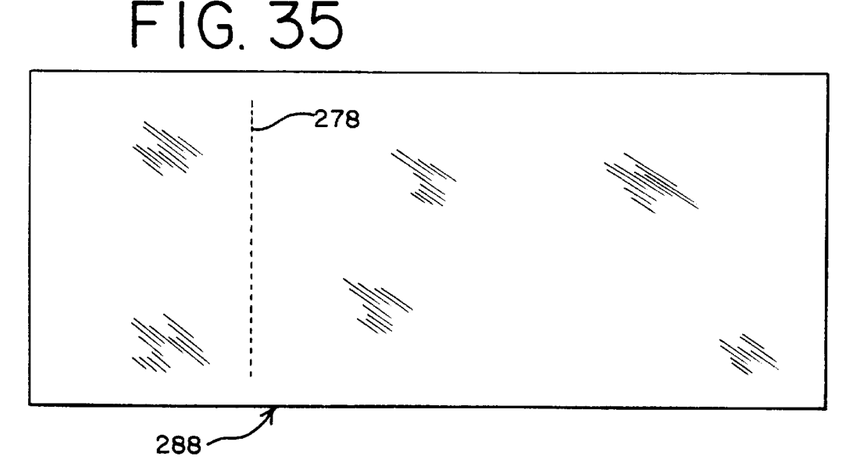
FIG. 35 is a plan view of a blank for forming the package of FIG. 30.

FIG. 35 illustrates a blank 288 for forming the package of FIGS. 30 through 34. The blank preferably has the line of weakness 278 preformed therein, before the sealing step which form and seal the package. The blank is a portion of a web of package material. The line of weakness 278 extends longitudinally of the web of package material, and may be formed as a continuous line extending along the web, or may, alternatively, be formed at package-length intervals with a length slightly shorter than the corresponding longitudinal dimension of the blank 288, as shown in FIG. 35. The end seals may have sufficient strength to act as stops for propagation of the slit during opening of the package.

Figure 36:
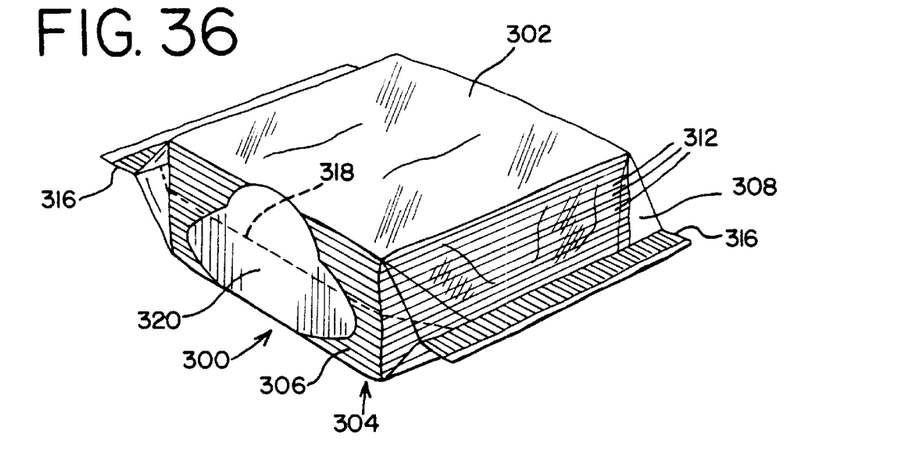
FIG. 36 is a perspective view of a package in accordance with a sixth embodiment of the invention.
Figure 37:
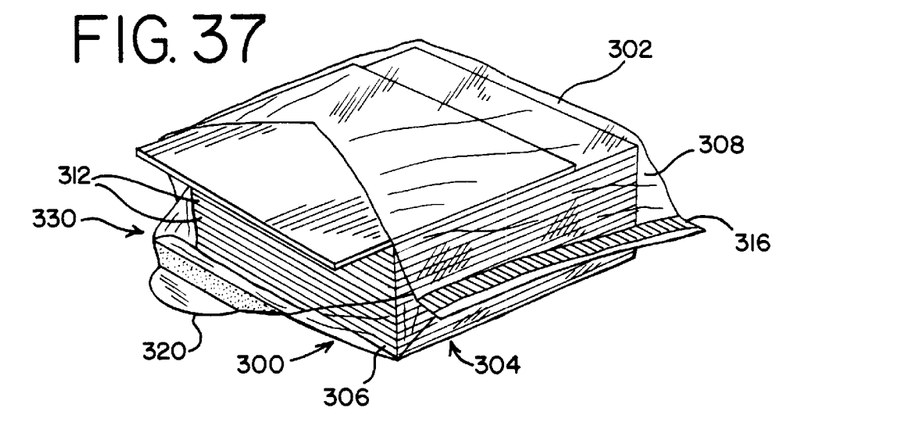
FIG. 37 is a perspective view of the package of FIG. 36, shown in a fully open configuration with a slice being withdrawn.
Figure 38:
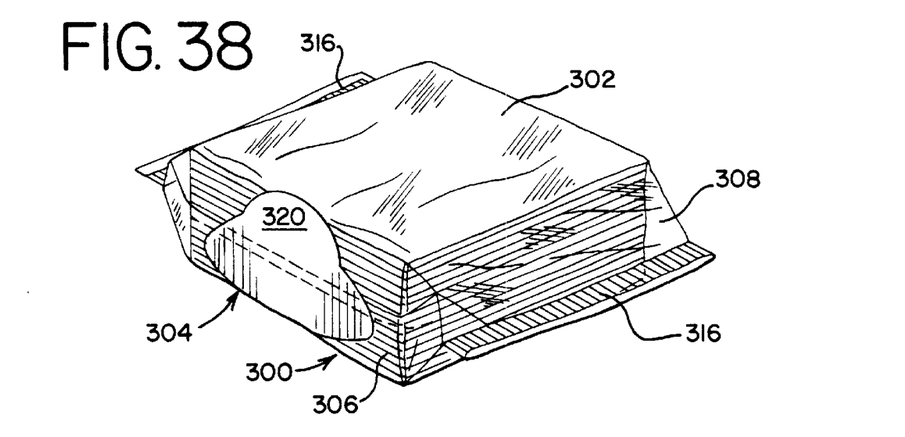
FIG. 38 is a perspective view of the package of FIG. 36, shown in a reclosed configuration.

FIGS. 36 through 38 illustrate a package in accordance with a sixth embodiment of the invention, comprising a top wall 302, a bottom wall 304, a pair of sidewalls 306 and a pair of end walls 308. Like the package described above with reference to FIGS. 30 through 34, the package of FIGS. 36 through 38 contains a stack of cheese slices 312 or other food product, and has a line of weakness 318 formed therein extending from one end seal 316 to the other, with a label 280 which functions in a manner generally similar to that of the package of FIGS. 30 through 34 spanning the line of weakness.

The package of FIGS. 36 through 38 may be formed in generally the same manner as the package of FIGS. 30 through 34. In the package of FIGS. 36 through 38, however, the line of weakness 318 does not extend along the top edge of the sidewall 306, but rather extends generally centrally across the width of the sidewall from one end seal to the other. Also, the label 280 which spans the line of weakness is disposed substantially entirely on the sidewall 306, rather than being folded over onto the top wall 302 as well, and the label has a varying width, being generally narrow adjacent the top of the label so that relatively little manual force is required to initiate peeling of the label away from the underlying flexible package material, and increasing in width so that increased force is applied to the package material by the label as the label is peeled downward away from the sidewall.

To facilitate parting of the flexible package material at the line of weakness 318 by application of force thereto through the label, the label 280 has its maximum width beneath the line of weakness. This increases the adhesive force between the label, and the underlying package material beneath the line of weakness, which contributes to maintaining the lower portion of the label 320 in place on the sidewall 306, as well as to enabling increased tearing force to be applied across the line of weakness. As continued force is applied to the label after the label has been peeled away from the package material above the line of weakness, the label does not peel away from the package material below the line of weakness, but rather remains attached thereto so that the force applied to the label is translated into tensile or shearing stress across the line of weakness, thus beginning formation of the slit or opening for removal of the food product, and faci- litating propagation thereof with further application of continued force to the label. Thus, as shown in FIG. 37, the package material parts at the line of weakness to form an opening 330 having a horizontal dimension greater than that of the slices of food product which are to be removed therethrough. After a desired number of slices have been removed, the package may then be reclosed by pulling the label or flap 320 back upward and resealing it to the package material on the sidewall 306 above the line of weakness as shown in FIG. 38.

From the foregoing, it should be appreciated that the invention provides a package which is relatively easily openable and reclosable by the consumer, and provides improved access to contents such as sliced food product as compared with reclosable packages known in the prior art. The invention is not limited to the embodiments described above, but is particularly pointed out in the following claims.

What is claimed is:

1. A combination of a flexible package and a stack of slices of a food product disposed within the package, said package comprising a single sheet of flexible material formed to enclose said stack;

said sheet of flexible material having a thickness in the range of about 0.001 to 0.004 in. and having first and second longitudinal edge portions joined to one another to form a longitudinal fin seal, and having transverse edge portions folded and joined to one another to form first and second transverse end seals intersecting said longitudinal fin seal at opposite ends of said longitudinal fin seal;

said transverse end seals each comprising an upper portion and a lower portion;

said package having a top wall, a bottom wall, a pair of upstanding sidewalls, and a pair of end walls, each end wall comprising one of said transverse end seals, each of said sidewalls having an upper edge, said package further comprising a tear strip laminated to the inside of the package, said tear strip having first and second end portions, with a first end portion secured to said upper portion of said first transverse end seal, and positioned between said user portion and said lower portion of said transverse end seal and extending from said first transverse end seal to the second transverse end seal, only along one side of said package, said tear strip having its end portions in close proximity to side edges of the end walls and extending along the upper edge of only one of said upstanding sidewalls and only said upper portion of said transverse end seals so that a relatively neat slit opening, for withdrawal of the slices of said food product, may be made at said transverse end seal along only said upper portion of said transverse end seals without tearing away said lower portion of said transverse end seals, and between said top wall and only said one of said upstanding sidewalls by tearing said tear strip, said tear strip having a thickness greater than that of said sheet of flexible material, said upper portion of one or both of said transverse end seals including means for providing a stress concentration along an edge of the film adjacent one or both ends of the tear strip to facilitate initiation of tearing.

2. A combination in accordance with claim 1 wherein said tear strip is of the same material as said flexible package material.

3. A combination in accordance with claim 1 wherein said means for providing a stress concentration comprises V notches adjacent both ends of said tear strip to facilitate initiation of tearing.

* * * * *

UNITED STATES PATENT AND TRADEMARK OFFICE
CERTIFICATE OF CORRECTION

PATENT NO. : 5,945,145
DATED : August 31, 1999
INVENTOR(S) : Jo Ellen Nielsen Narsutis et al.

It is certified that error appears in the above-identified patent and that said Letters Patent is hereby corrected as shown below:

Column 12, line 13, change "user" to --upper--.

Signed and Sealed this

Eighteenth Day of July, 2000

Attest:

Q. TODD DICKINSON

*Attesting Officer*      *Director of Patents and Trademarks*